Sept. 6, 1966   M. J. DECHANTSREITER   3,270,893
STACKER CRANE WEIGHING MECHANISM
Original Filed Dec. 24, 1964   5 Sheets-Sheet 1

INVENTOR.
MAX J. DECHANTSREITER
BY James E. Nilles
ATTORNEY

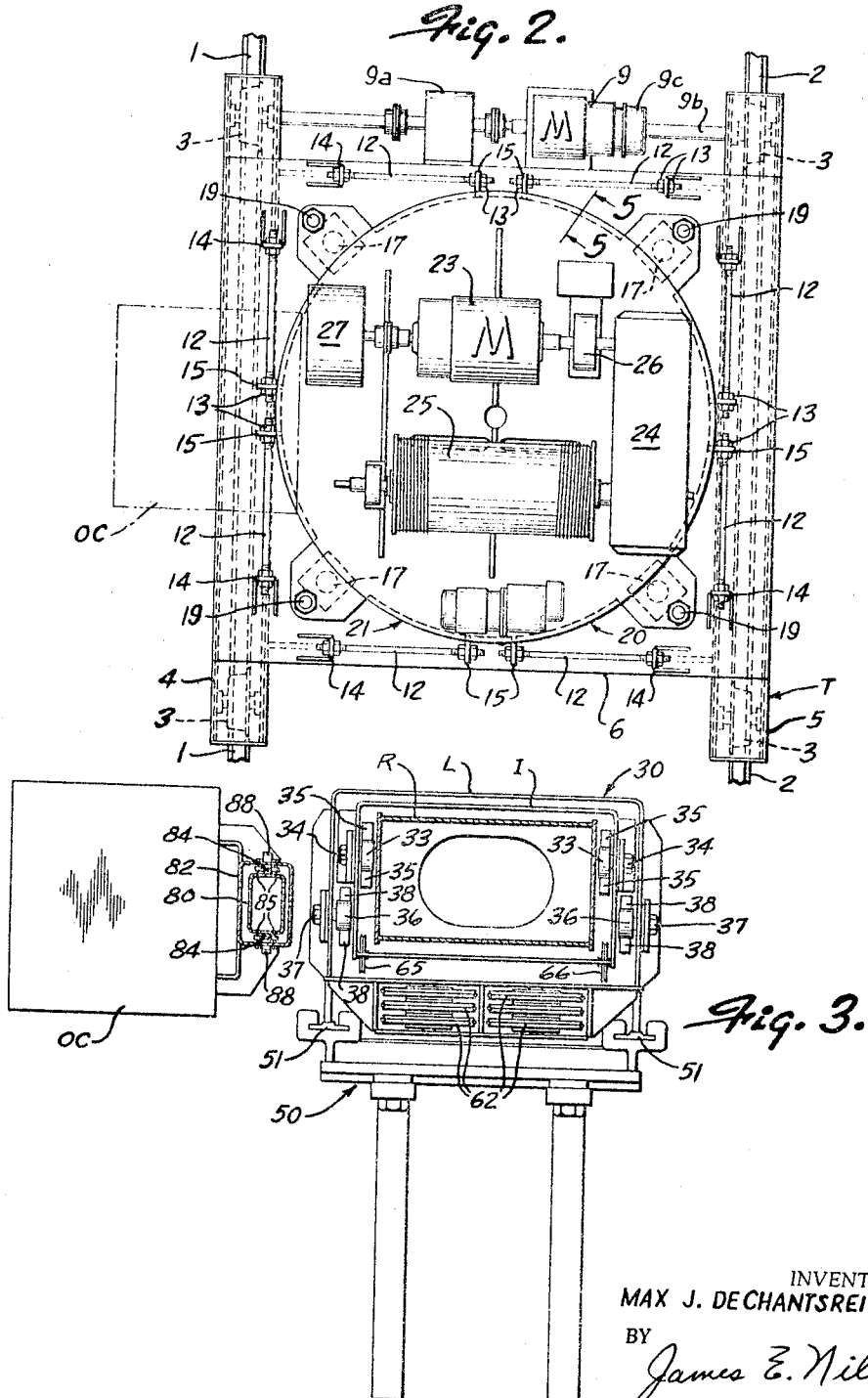

INVENTOR.
MAX J. DECHANTSREITER
BY
James E. Nilles
ATTORNEY

INVENTOR.
MAX J. DECHANTSREITER
BY James E. Nilles
ATTORNEY

Sept. 6, 1966　　　M. J. DECHANTSREITER　　　3,270,893
STACKER CRANE WEIGHING MECHANISM
Original Filed Dec. 24, 1964
5 Sheets-Sheet 5

INVENTOR.
MAX J. DECHANTSREITER
BY James E. Nilles
ATTORNEY

United States Patent Office 3,270,893
Patented Sept. 6, 1966

3,270,893
STACKER CRANE WEIGHING MECHANISM
Max J. Dechantsreiter, Milwaukee, Wis., assignor to Harnischfeger Corporation, West Milwaukee, Wis., a corporation of Wisconsin
Original application Dec. 24, 1964, Ser. No. 420,908. Divided and this application Nov. 10, 1965, Ser. No. 507,207
3 Claims. (Cl. 212—2)

This is a divisional application of the co-pending U.S. patent application Serial No. 420,908, filed December 24, 1964, entitled "Stacker Crane," which issued on May 10, 1966 as Patent No. 3,250,399.

The present invention relates generally to material handling devices and, more particularly, to travelling cranes supported by overhead rails and having a vertical, rigid, telescoping mast on which a load carriage is vertically moveable. These devices are sometimes referred to as stacker cranes.

The present invention relates to a stacker crane having a rotatable vertical mast on a trolley frame, which crane has an improved weighing ring and mounting therefor.

Other objects and advantages of the present invention will appear hereinafter as this disclosure progresses, reference being had to the accompanying drawings, in which:

FIGURE 2 is a plan view of the crane shown in FIGURE 1, certain parts being shown as broken away;

FIGURE 3 is a section view taken along line 3—3 in FIGURE 1 on an enlarged scale;

Figure 1:
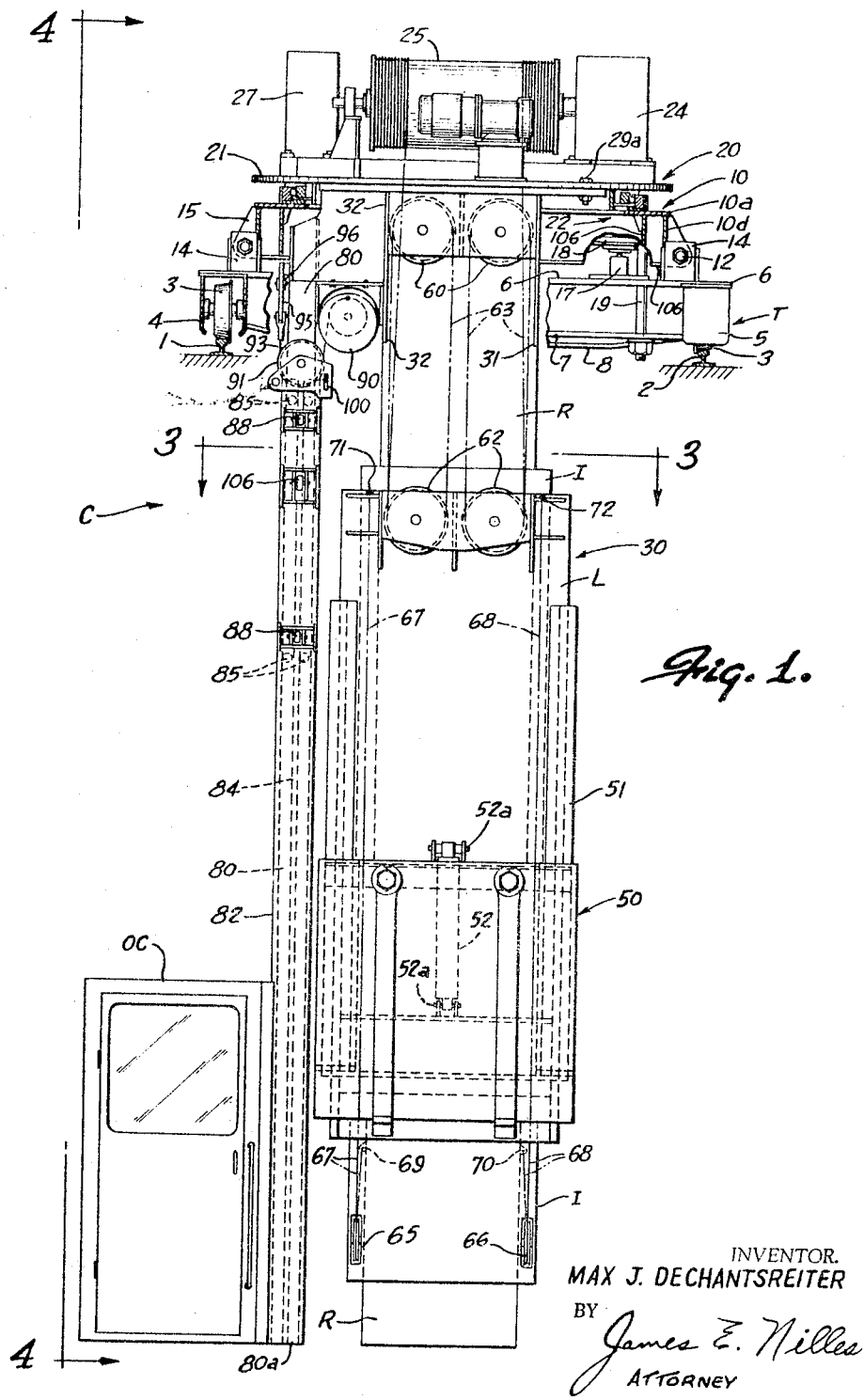
FIGURE 1 is an elevational view of a stacker crane made in accordance with the present invention, certain parts being shown as broken away or in section for clarity in the drawing, and the crane shown in the full retracted or "up" position.

Referring in greater detail to the drawings, a pair of overhead rails 1 and 2 are provided in spaced apart relationship and on which the entire crane C is supported for travel between the rails. These rails are suitably mounted in any conventional manner, not shown, as for example, as part of an overhead runway structure or building structure.

Trolley frame

A trolley T has a series of wheels 3 which ride along and are guided by rails 1 and 2, the wheels being suitably journalled in the two parallel, frame members 4 and 5. A large, rectangular, steel plate 6 is welded across the upper sides of members 4 and 5 and other steel plates 7 and 8 are also welded to members 4 and 5, all forming a rigid trolley frame. The trolley is driven along the rails in either direction by an electric motor 9 through the drive box 9a and the drive shaft 9b on which some of the wheels 3 are fixed. A brake 9c is also provided for the motor.

Figure 5:
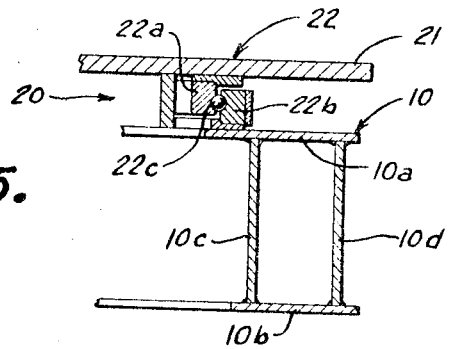
FIGURE 5 is a cross sectional view taken along line 5—5 in FIGURE 2, but on an enlarged scale.

The trolley also includes a large circle or ring 10 which, as shown clearly in FIGURE 5, is comprised of an upper ring plate 10a and a lower, ring plate 10b parallel thereto, an inner, vertical ring wall 10c and an outer vertical ring wall 10d, all welded together to form the ring 10 having a rectangular cross sectional shape.

The ring 10 is secured to the horizontal plate 6 of the trolley frame by a series of eight horizontal bars 12, two on each side of the frame, as clearly shown in FIGURE 2. These bars are secured by nuts 13 to brackets 14 welded to the plate 6, and to brackets 15 welded to the periphery of ring 10. By this means the ring 10 is prevented from moving horizontally relative to plate 6.

Weighing mechanism

Means are also provided, as will now be described, for vertically supporting the ring 10 on plate 6 in such a manner that the load on the crane can be weighed.

Four load weighing cells 17 are located in circumferentially spaced relationship on top of plate 6 and the plates 18 of the ring 10 rest on top of these cells. Thus the cells act to read the weight of the load carried by the crane, as will appear later. The load cells cannot tolerate any side loading and the horizontal bars 12 insure that side loading of the cells does not occur.

Upward movement of the ring 10 relative to plate 6 is limited by the four vertical bolt means 19 extending therethrough. These bolt means, however, do not restrict downward, weighing movement of the ring 10 relative to plate 6.

Turntable

A turntable 20 is carried on the trolley frame for rotation about a central, vertically disposed axis. This turntable carries a downwardly depending mast assembly which will be described later and which rotates together with the turntable as a single unit about this vertical axis.

The turntable includes a large, horizontal, circular, steel plate 21 which is rotatably supported by the large, anti-friction, bearing ring assembly 22 located on the top of ring 10. Assembly 22 includes an inner race 22a secured to the underside of the turntable, an outer race 22b secured to the upper side of ring 10, and a series of balls 22c located between the races in the conventional manner to carry vertical and horizontal thrust components.

Located on top of the turntable is the conventional electric motor 23 connected by the drive reduction unit 24 to the cable drum 25. A brake 26 is located between the motor and drum, and an eddy current brake 27 is connected with the motor, for purposes that will appear later.

Mast assembly

A mast assembly 30 is rigidly fixed to the underside of the turntable and extends downwardly therefrom. The mast assembly includes rigid mast R welded to an upper plate 29 and two large gusset plates 31, 32 are welded between mast R and plate 29 for rigidity and reinforcement. Plate 29 is then in turn rigidly secured to turntable plate 21 by bolt means 29a. The assembly also includes a shorter, intermediate mast I which slides up and down on the long mast R, and also includes a load mast L which can be vertically positioned relative to the intermediate mast. As shown in FIGURE 3, these masts are rectangular in cross section and nested together in telescoping relationship. More specifically, a pair of rollers 33 are mounted by bolt means 34 along each of the opposite sides of the load mast R and are held captive and guided in their vertical movement by the pairs of rails 35 (FIGURES 3 and 4) fixed to the opposite sides of intermediate mast R. Similarly, a pair of rollers 36 are mounted by bolt means 37 along each of the opposite sides of load mast L for being guided by the pairs of opposed rails 38 fixed to the opposite sides of the intermediate mast I.

Other pairs of rollers 44 (FIGURE 4) are mounted on the opposite sides of the load mast about horizontal axes and rotate in abutting relationship with the intermediate mast to provide guiding and stabilizing therebetween in a direction parallel to the axis of rollers 36. Reinforcing gusset plates 45 are welded to the mast L and to the bracket mounting 44a for rollers 44.

The load mast may have a lift fork unit 50 vertically adjustable along the pair of vertical rails 51 by means of a hydraulic cylinder 52 connected between the unit 50 as at 52a (FIGURE 4) and the load mast as at 52b. The rails 51 are of T shape cross section and are welded along their length to the load mast.

*Power lift*

Figure 6:
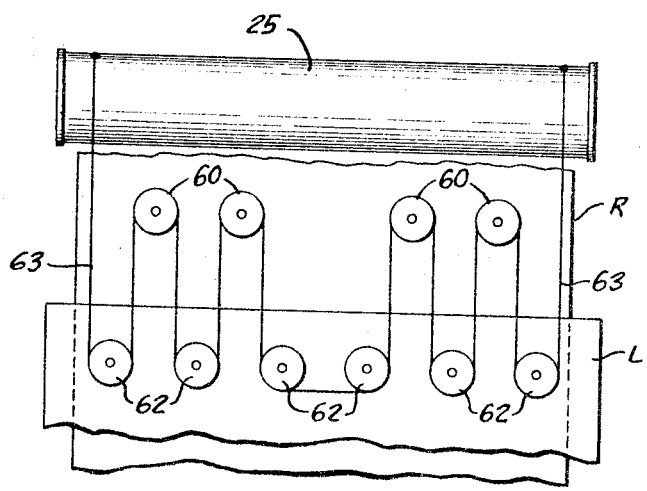
FIGURE 6 is a diagrammatic view of the primary cable lifting system.

A cable lifting system is provided directly between the load mast L and the rigid mast R. This multiple-sheave system imposes the entire load directly on the turntable without going through the intermediate mast I. This system is shown diagrammatically or in a "spread out" manner in FIGURE 6.

More specifically, a plurality of sheaves 60 are rotatably mounted on the upper end of the rigid mast R and a plurality of sheaves 62 is also rotatably mounted directly on the load mast L. A cable 63 is attached to the drum 25 at each of its ends and trained around sheaves 60 and 62 as shown.

Figure 4:
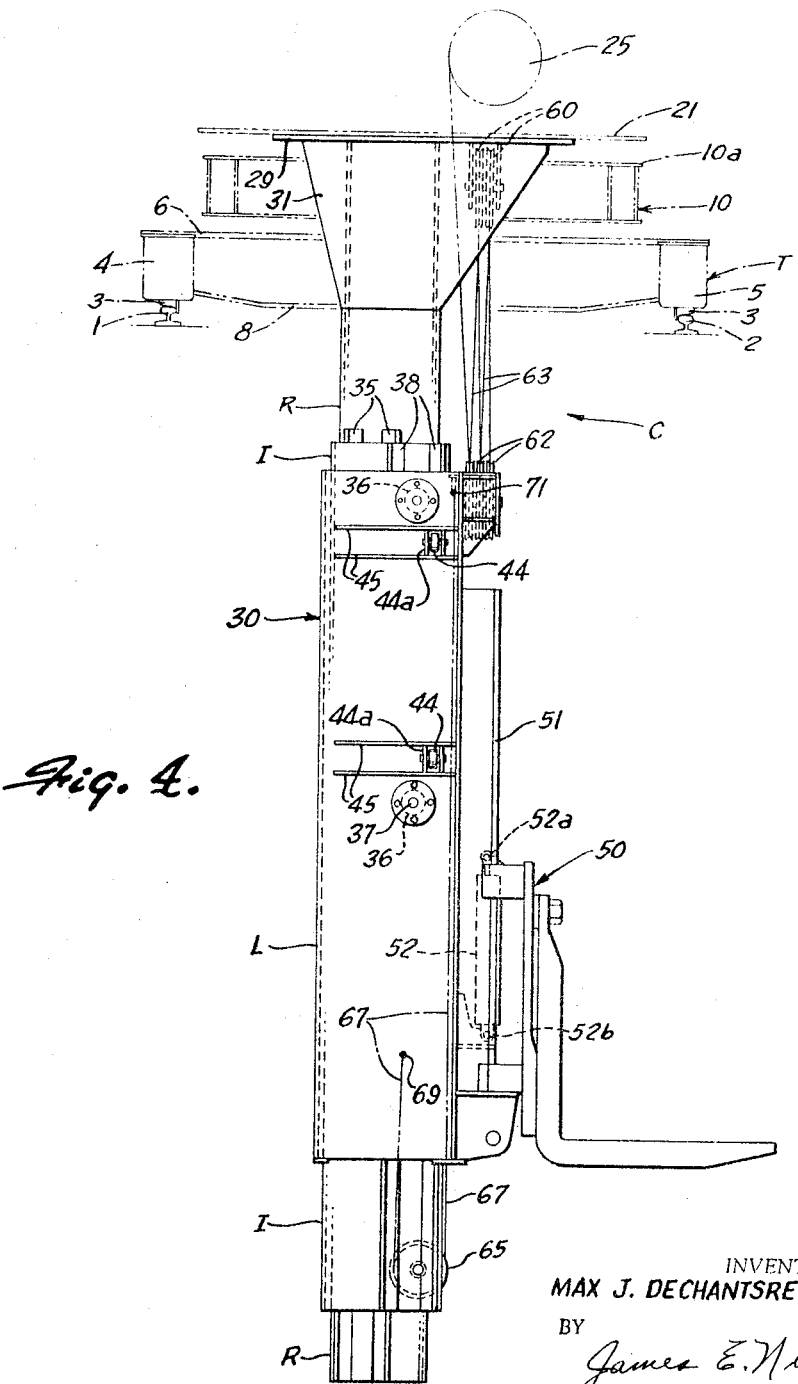
FIGURE 4 is an elevational view of a portion of the crane shown in FIGURE 1, taken from line 4—4 in FIGURE 1, certain parts being removed for clarity.

As shown in FIGURES 1 and 4, there is also provided a flexible member connection between the three masts R, I and L but this connection does not perform any function of lifting the load. Instead it serves to transmit the weight of the intermediate mast I to the rigid mast, and keeps the intermediate mast in proper relationship to the load mast and rigid mast.

This flexible member connection includes a pair of sheaves 65, 66 rotatably mounted at the lower end of the intermediate mast I, having a cable 67, 68 respectively, trained therearound. These cables 67 and 68 are deadended to the rigid mast R at 69 and 70, respectively, and to the load mast at 71 and 72, respectively. This system insures that the relative proportionate vertical speed between the load mast and intermediate mast remains the same. For example, if the load mast moves at ten feet per second, then the intermediate mast will move at one-half that speed, namely five feet per second.

The present arrangement requires only one cable lift system to carry the entire load and only a lightweight flexible lift connection is required to support the intermediate mast and coordinate its movement with the load mast.

*Operator's cab—FIGURES 1 and 3*

The cab mast assembly is shown in FIGURE 1 in the fully retracted or "up" position and is shown for illustrative purposes only as comprising two telescoping mast members, namely, a fixed inner mast 80 rigidly secured at its upper end to the rigid mast and which extends downwardly to terminate at 80a. The second member is an outer mast 82 which telescopes over the inner mast. The cab is rigidly attached to the outer mast for vertical movement therewith.

The members 80 and 82 are mounted together as follows. Guide rails 84 are secured one along the length of each of the opposite outer sides of the inner mast. Pairs of rollers 85 are mounted on the inside of each of the opposite sides of the outer mast and these rollers engage opposite sides of the adjacent rail.

Outer rollers 88, disposed on axes ninety degrees to those of the rollers 85, are rotatably mounted on opposite sides of the outer mast 82 and roll against the rails 84. By means of these rollers 85 and 88, guiding support in all directions is provided between the inner and outer masts as they telescope relative to one another.

Figure 7:
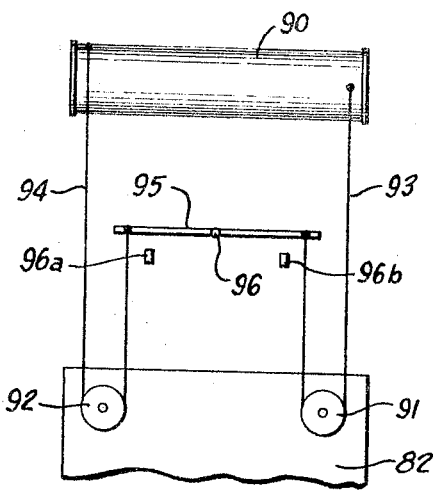
FIGURE 7 is a diagrammatic view of the lifting means for the operator's cab.

FIGURE 7 is a schematic diagram of the lifting arrangement for the cab. The cab is vertically positioned by a hoist drum 90 (FIGURE 1) mounted on the trolley frame and two sheaves 91 and 92 mounted on the outer mast 82. A pair of cables 93 and 94 are fixed at one of their ends to the drum, and are then trained around the sheaves 91 and 92 and then dead-ended to an equalizer bar 95. Bar 95 is pivotal mounted at 96 on the trolley frame. Stops 92a and 96b prevent excessive movement of the bar 95. A measure of safety is provided by the use of two cables and an equalizer bar because, in the event one cable breaks, the other will hold the cab.

Furthermore, broken rope safety devices for the load are not necessary to insure safety of the operator. If a load cable breaks, it is not necessary to "catch" a twenty-five ton falling load for example, and instead the load can be permitted to fall without damaging the crane and/or its supporting structure.

*Cab safety device*

Figure 8:
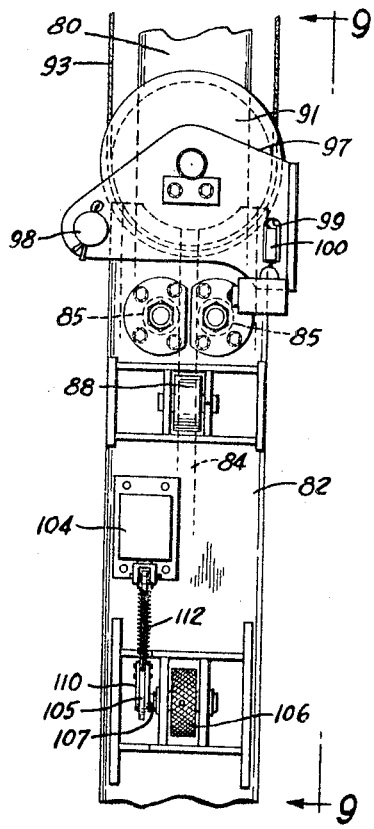
FIGURE 8 is an enlarged, fragmentary view of a portion of the upper end of the cab mast shown in FIGURE 1, with certain parts removed for clarity.
Figure 9:
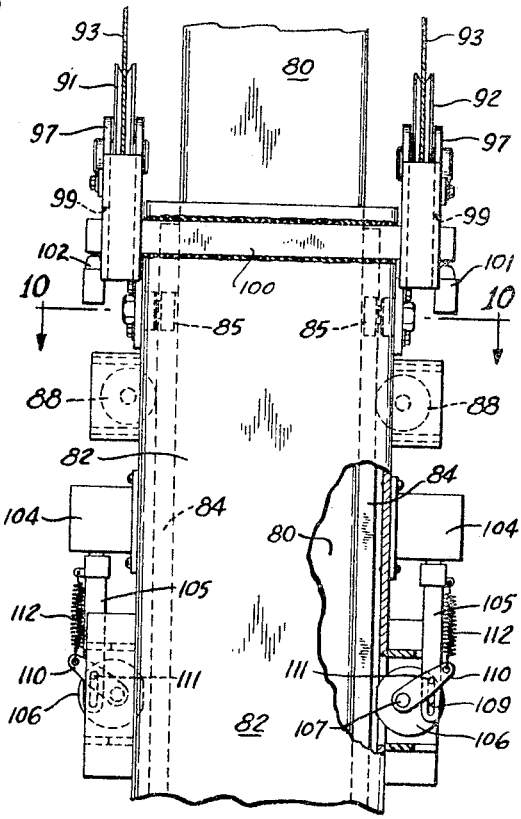
FIGURE 9 is a view taken along line 9—9 in FIGURE 8, certain parts being removed or broken away for clarity.

A broken rope safety device is provided for catching the operator's cab in the event a hoist cable breaks, and this device is shown in detail in FIGURES 8 and 9. The mounting for each of the sheaves 91 and 92 is similar and one will be described. A sheave bracket 97 is pivotally mounted on the shaft 98 fixed on the upper end of mast member 82. Brackets 97 have slots 99 in each of their slides through which a bar 100 extends loosely. Bar 100 is welded to the upper end of mast 82 and is normally contacted by micro-switches 101 and 102 carried on the sheave brackets.

Figure 11:
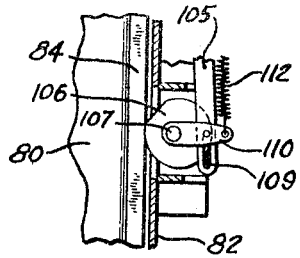
FIGURE 11 is a view of a portion of FIGURE 9, but showing the cab in the mast locking position.
Figure 10:
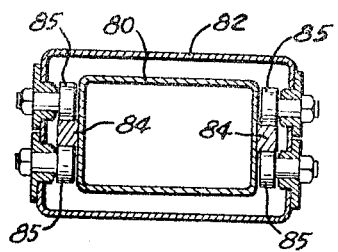
FIGURE 10 is a sectional view taken along line 10—10 in FIGURE 8.

If the cable 91 is not broken and the cab mast operating normally, the brackets are pulled upwardly against the bar 100. If the cable 93 breaks, either one or both of the brackets 97 instantly drops, carrying the switches with them and away from contact with bar 100. This action opens either one or both of the switches which in turn de-energizes solenoids 104. De-energizing of a solenoid causes downward shifting of its link 105 and causes its cam 106 to be rotated from the mast unlocked position shown in FIGURE 9 to the mast locked position shown in FIGURE 11. When the cams are in the FIGURE 11 position, they bind or lock against the inner mast member 80 and lock the outer mast member 82 thereagainst it. The cams are suitably journalled on their shaft 107 and extend through slots 108 in the outer mast member 82. An overtravel slot 109 is provided in link 105 and arm 110 fixed to shaft 107 has a pin 111 fixed thereto which travels in this slot. Thus, the solenoid 104 can return freely to its normally energized position. Spring 112 returns the cam to its normal "running," unlocked position where its flat, clearance portion 113 permits free movement between the mast members 80 and 82.

Various modes of carrying out the invention are contemplated as being within the scope of the following claims particularly pointing out and distinctly claiming the subject matter which is regarded as the invention.

I claim:
1. An overhead travelling crane having a trolley frame adapted to be driven along rails in either direction, a plurality of load weighing cells on said trolley frame, a large support ring mounted on said cells, a turntable rotatably mounted on said ring on an anti-friction bearing ring assembly, a downwardly extending mast assembly secured to said turntable for rotation therewith, means to prevent horizontal movement of the support ring relative to the trolley frame to thereby prevent side loading of the load cells, and means to prevent upward movement of said support ring relative to said trolley frame beyond predetermined limits.

2. A crane as defined in claim 1 further characterized in that said anti-friction bearing ring assembly is located on top of said support ring, and said turntable is comprised of a horizontal steel plate which rests on top of said anti-friction bearing ring assembly, said mast assembly extending downwardly through the center of said support ring.

3. The crane set forth in claim 2 wherein said support ring is fabricated from a pair of vertically spaced steel plates arranged in parallelism, and said means for preventing unlimited upward movement of said ring includes vertical bolt means secured to said trolley frame and extending upwardly through said ring.

References Cited by the Examiner

UNITED STATES PATENTS

| | | | |
|---|---|---|---|
| 3,028,923 | 4/1962 | Locher | 177—132 |
| 3,111,227 | 11/1963 | Lofquist | 212—128 |
| 3,144,137 | 8/1964 | Valliere et al. | 212—128 |

FOREIGN PATENTS 1,060,787  7/1959  Germany.

ANDRES H. NIELSEN, *Primary Examiner.*